US012674590B2

(12) United States Patent
Jackson et al.

(10) Patent No.: US 12,674,590 B2
(45) **Date of Patent: *Jul. 7, 2026**

(54) MISTING FAN

(71) Applicant: Home Depot Product Authority, LLC, Atlanta, GA (US)

(72) Inventors: Nicholas Jackson, Marietta, GA (US); Jason Gebhardt, Buffalo Grove, IL (US)

(73) Assignee: Home Depot Product Authority, LLC, Atlanta, GA (US)

( * ) Notice: Subject to any disclaimer, the term of this patent is extended or adjusted under 35 U.S.C. 154(b) by 637 days.

This patent is subject to a terminal disclaimer.

(21) Appl. No.: 17/537,442

(22) Filed: Nov. 29, 2021

(65) Prior Publication Data

US 2022/0082276 A1 Mar. 17, 2022

Related U.S. Application Data

(63) Continuation of application No. 16/248,260, filed on Jan. 15, 2019, now Pat. No. 11,187,421.

(51) Int. Cl.

| | |
|---|---|
| ***F24F 7/007*** | (2006.01) |
| ***F04D 25/08*** | (2006.01) |
| ***F04D 29/70*** | (2006.01) |

(52) U.S. Cl.

CPC ............ *F24F 7/007* (2013.01); *F04D 25/088* (2013.01); *F04D 29/705* (2013.01); *F05D 2300/512* (2013.01); *F24F 2221/14* (2013.01)

(58) Field of Classification Search

CPC .......... F24F 7/007; F24F 2221/14; F24F 6/14; F04D 25/088; F04D 29/705; F05D 2300/512; B05B 7/0075; B05B 7/0081

USPC .................................... 239/289, 209; 261/28

See application file for complete search history.

(56) References Cited

U.S. PATENT DOCUMENTS

| | | | | |
|---|---|---|---|---|
| 4,907,654 A | | 3/1990 | Eberhardt | |
| 4,976,319 A | | 12/1990 | Eberhardt et al. | |
| 5,524,450 A | | 6/1996 | Chen | |
| 6,017,188 A | | 1/2000 | Benton | |
| 6,086,053 A | * | 7/2000 | Natschke | F24F 6/14 239/289 |
| 6,257,501 B1 | | 7/2001 | Roach et al. | |
| 6,257,502 B1 | | 7/2001 | Hanish et al. | |

(Continued)

FOREIGN PATENT DOCUMENTS

| | | | | |
|---|---|---|---|---|
| CN | 204853775 U | * | 12/2015 | |
| CN | 109026783 A | * | 12/2018 | B05B 9/04 |

(Continued)

OTHER PUBLICATIONS

Office Action from Chinese application No. 202010042354.8, dated Nov. 30, 2023, 26 pp.

*Primary Examiner* — Kevin Edward Schwartz

(74) *Attorney, Agent, or Firm* — Greenberg Traurig, LLP

(57) ABSTRACT

A misting fan system includes a fan and a mister positioned above the fan. The fan includes a motor and a plurality of fan blades operably coupled thereto. Each of the fan blades comprises a base member and a paddle member mated to the base member, and each paddle member comprises an upper surface and a lower surface. A hydrophobic coating may be applied to at least one of the upper surface and the lower surface of the paddle member of at least one of the plurality of fan blades.

18 Claims, 6 Drawing Sheets

(56) References Cited

U.S. PATENT DOCUMENTS

| | | | | |
|---|---|---|---|---|
| 6,587,642 | B1 * | 7/2003 | King | F04D 25/088 392/364 |
| 6,623,241 | B2 | 9/2003 | Blangetti | |
| 6,631,243 | B2 | 10/2003 | Reiker | |
| 6,659,721 | B1 | 12/2003 | Parker et al. | |
| 6,827,290 | B2 | 12/2004 | Zimmerman | |
| 7,381,129 | B2 | 6/2008 | Avedon | |
| 7,422,163 | B1 | 9/2008 | DeVorss | |
| 7,806,388 | B2 | 10/2010 | Junkel | |
| 8,985,557 | B2 | 3/2015 | Canipe et al. | |
| 9,267,698 | B2 * | 2/2016 | Stearns | F24F 7/007 |
| 9,410,048 | B2 | 8/2016 | Katou | |
| 9,500,098 | B2 | 11/2016 | Dorshimer et al. | |
| 9,683,752 | B2 | 6/2017 | Edwards et al. | |
| 10,676,954 | B1 * | 6/2020 | Oppenheim | E04H 15/14 |
| 11,187,421 | B2 * | 11/2021 | Jackson | F04D 29/388 |
| 2007/0154315 | A1 * | 7/2007 | Bucher | F04D 29/601 416/210 R |
| 2013/0219933 | A1 | 8/2013 | Hubert et al. | |
| 2013/0294926 | A1 | 11/2013 | Katou | |
| 2015/0054181 | A1 * | 2/2015 | Martin | F24F 5/0035 261/28 |
| 2015/0064451 | A1 | 3/2015 | Kalaga et al. | |
| 2015/0110625 | A1 * | 4/2015 | De Siqueira Indio Da Costa | F24F 5/0035 416/62 |
| 2016/0318045 | A1 * | 11/2016 | Huffington | B05B 1/185 |
| 2017/0038084 | A1 * | 2/2017 | Edwards | F04D 17/16 |
| 2017/0248347 | A1 | 8/2017 | Miller | |
| 2017/0298952 | A1 | 10/2017 | Learn et al. | |
| 2018/0149376 | A1 | 5/2018 | Hale | |
| 2018/0361405 | A1 * | 12/2018 | Hartman | B05B 7/045 |
| 2019/0144122 | A1 * | 5/2019 | Loth | B64F 5/40 427/387 |

FOREIGN PATENT DOCUMENTS

| | | | |
|---|---|---|---|
| TW | M304586 U | * | 1/2007 |
| TW | M460940 U | * | 9/2013 |

* cited by examiner

MISTING FAN

CROSS-REFERENCE TO RELATED APPLICATION

This application is a continuation of U.S. application Ser. No. 16/248,260, filed Jan. 15, 2019, which application is hereby incorporated by reference in its entirety.

BACKGROUND

Misting systems are used to convert water or other liquids into a mist or fog. A mist of ultra-fine water droplets introduced into warm or hot air quickly evaporates, absorbing heat from and thereby cooling the air. It is known in the art to combine water mists with moving air by placing a mister near a fan. In such systems, the mist is pulled into the fan's air stream, causing the mist to be distributed over a greater air volume, and at the same time increasing convective cooling.

DETAILED DESCRIPTION

Known misting fan systems and apparatuses may not adequately disperse mist that is projected to the fan. For example, in some systems, water droplets may accumulate on the fan blades and, where the fan is a ceiling fan, the droplets may fall off of the fan blades. As a result, instead of dispersing the volume of water expelled by the mister as mist, a portion of the mist may fall as larger water droplets on occupants of the space in which the fan is used.

A misting fan system according to the present disclosure can improve upon the mist dispersion provided by known misting fan systems by including one of several features that reduce the amount of mist that accumulates on the fan blades as droplets. For example, a misting fan system may include a hydrophobic coating on the upper and/or lower surfaces of one or more (e.g., all) of the fan's blades. In another example, one or more of the fan's blades may include a leading edge that is thinner than the trailing edge. In another example, the mister may be arranged with respect to the fan blades such that that misted releases mist directly above at least a portion of the paddle portion of one or more of the fan blades. These features may be incorporated alone or in various combinations, in embodiments, to provide a misting fan system with improved mist dispersion.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
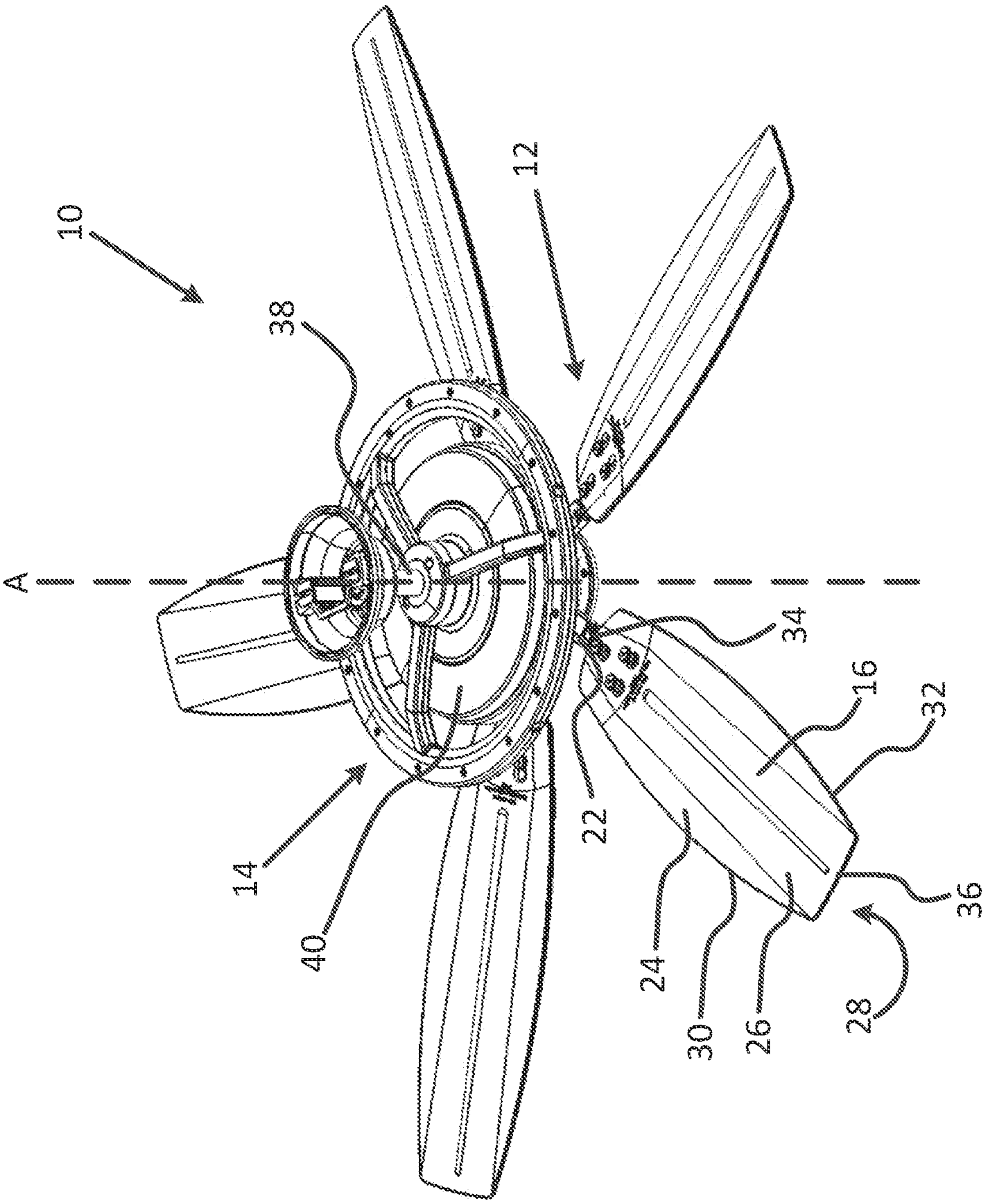
FIG. 1 is a perspective view of an example misting fan system, in accordance with various embodiments of the present invention.
Figure 2:
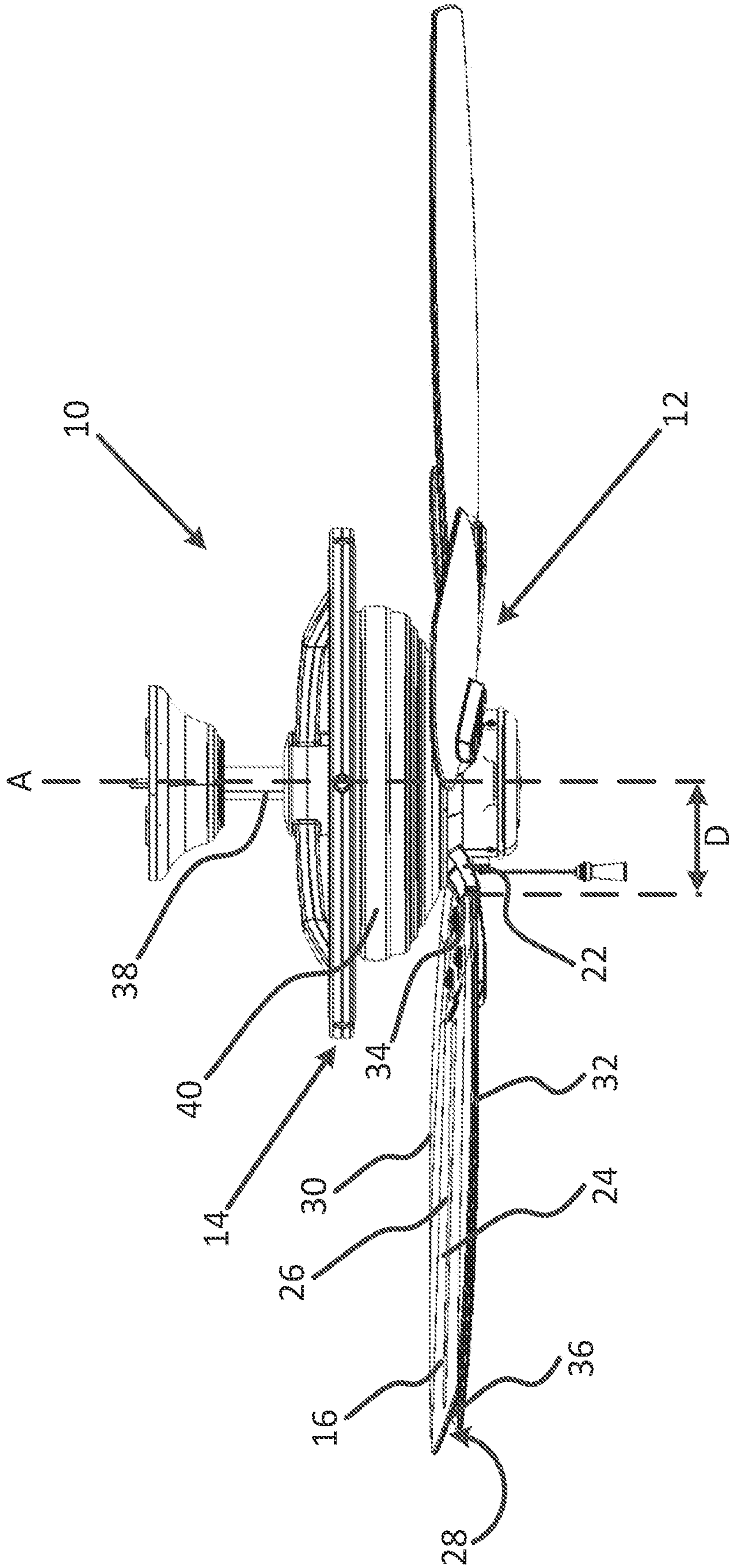
FIG. 2 is a front view of the example misting fan system of FIG. 1, in accordance with various embodiments of the present invention.
Figure 3:
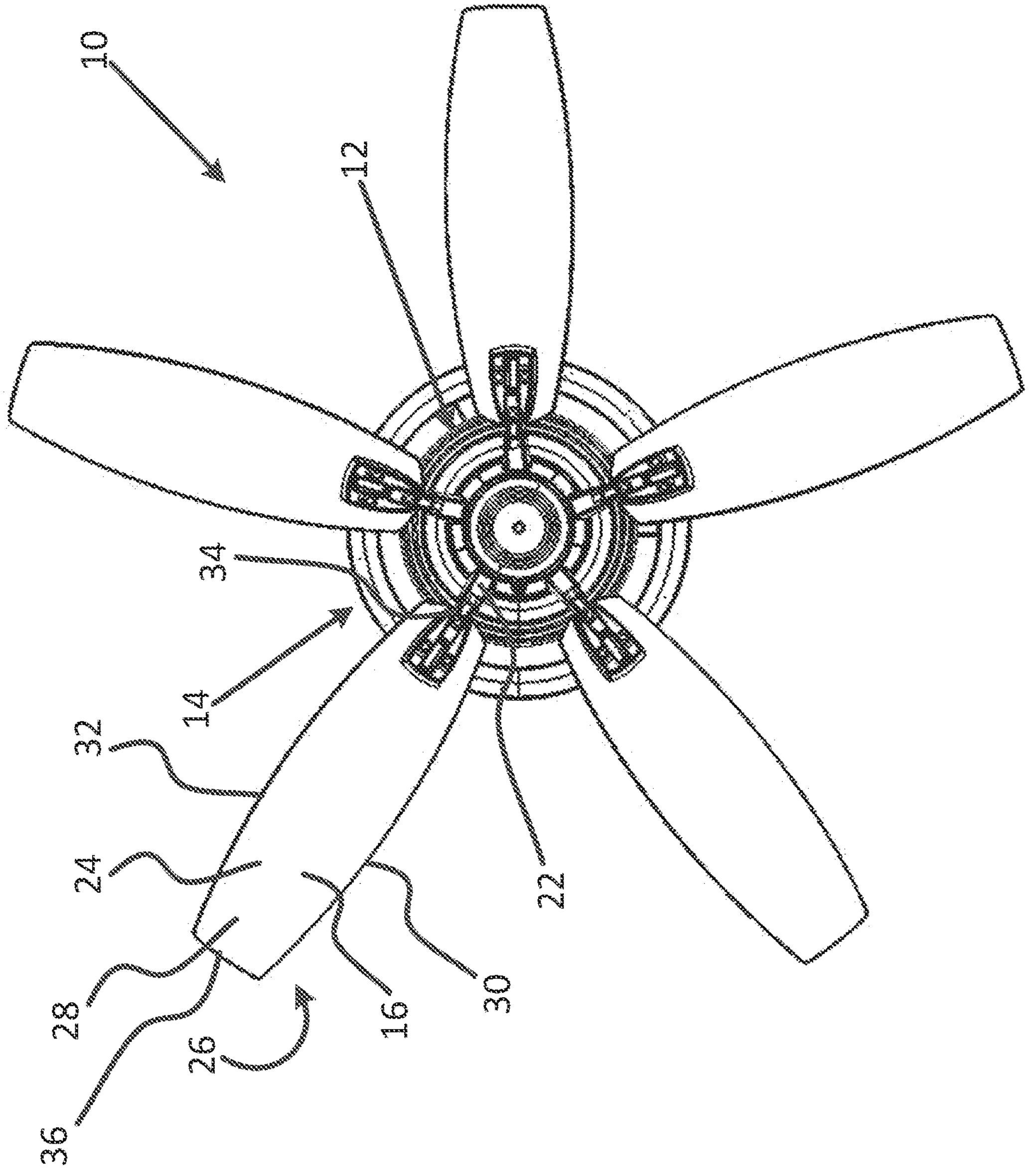
FIG. 3 is a bottom view of the example misting fan system of FIG. 1, in accordance with various embodiments of the present invention.

Referring now to the drawings, wherein like numerals refer to the same or similar features in the various views, FIGS. 1-3 are perspective, front and bottom views, respectively, of an example misting fan system 10 in accordance with various embodiments of the present invention. The example misting fan system 10 includes a fan 12 and a mister 14 positioned above the fan 12. The fan 12 includes a motor and a plurality of fan blades 16 operably coupled to the motor so as to be rotated by the motor. Each of the fan blades 16 includes a base member 22 and a paddle member 24 mated to the base member 22. Each paddle member 24 includes an upper surface 26 and a lower surface 28. Each paddle member 24 also includes a leading edge 30 and a trailing edge 32 relative to a direction of movement of the paddle member 24 when the fan 12 is in operation. Each paddle member 24 further includes an inner end 34 proximate the motor and an outer end 36 distal to the motor, wherein the inner end 34 is spaced a first distance D away from a central axis A. The central axis A may be an axis of rotation of the paddle members, in an embodiment. In operation, the mister may produce a mist and may expel that mist towards the fan blades. When rotated by the motor, the fan blades may disperse the mist.

The example misting fan system 10 includes a fan 12 that is depicted and described herein as a ceiling fan. Accordingly, references to "upper", "lower", "above", below", and similar directional terms are with respect to gravity.

In one embodiment of the present disclosure, at least one of the upper surface 26 and the lower surface 28 of the paddle member 24 of at least one of the plurality of fan blades 16 may include a hydrophobic coating. In an embodiment, both the upper surface 26 and the lower surface 28 of at least one paddle member 24 may include the hydrophobic coating. In an embodiment, at least one of the upper surface 26 and the lower surface 28 of each paddle member 24 may include the hydrophobic coating. The hydrophobic coating may optionally be UV resistant (that is, resistant to ultraviolet light).

In an embodiment of the present disclosure, the leading edge 30 of at least one of the paddle members 24 is thinner than the trailing edge 32 of that paddle member 24. In an embodiment, each paddle member 24 includes a leading edge 30 that is thinner than its trailing edge 32. As noted above, the leading edge 32 of a paddle member may be determined by the direction of movement of the fan 12. As is known in the art, ceiling fans may include a selectable rotation direction—a first direction for warm-weather operation, and the reverse direction for cold-weather operation. The relevant direction of movement may be for use in warm-weather operation, when misting fan systems are generally used in order to cool a space. As is also known in the art, fan blades may be angled with respect to the ground. In warm-weather operation of a ceiling fan, the fan blades may be angled such that the leading edge is higher than the trailing edge, such that rotation of the paddle members 24 pushes air down through the paddle members 24. Accordingly, a ceiling fan in a fan system according to the present disclosure may include blades having leading edges that are lower than their trailing edges.

Each paddle member 24 may be made of plastic, in some embodiments. However, as will be appreciated by one of ordinary skill in the art, in other embodiments, the paddle members 24 may be made of any suitable material, such as for instance, wood, aluminum, etc., or a combination of two or more suitable materials.

The example fan 12 illustrated in FIGS. 1-6 includes five fan blades 16. However, as will be appreciated by one of ordinary skill in the art, the fan 12 may include as few as two fan blades 16, or three, four, five, or more fan blades 16, or any other appropriate quantity of blades 16.

As shown in FIGS. 1 and 2, the example misting fan system 10 may further include a support shaft 38 connected to the fan 12 for supporting the fan 12 to an upper support surface, such as a ceiling, thereby supporting the fan above a ground surface. The fan 12 may further include a fan motor housing 40 that contains the fan motor to which the blades are coupled. In an embodiment, the mister 14 is mechanically coupled to the support shaft 38. Additionally or alternatively, the mister 14 may be mechanically coupled to the fan motor housing 40. It will be appreciated, however, that the mister 14 may be coupled to the fan 12 using any suitable method or type of coupling.

Figure 4:
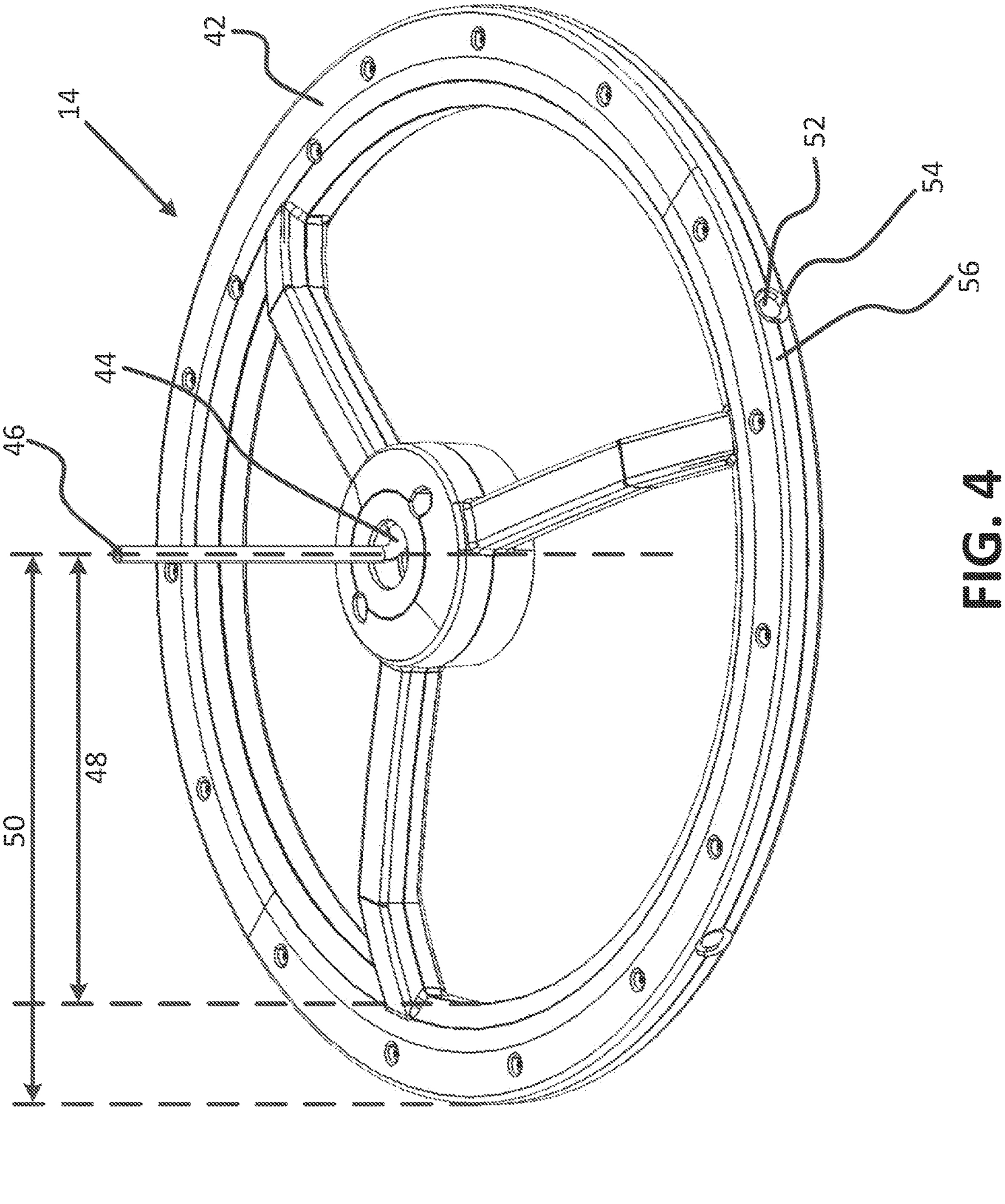
FIG. 4 is a perspective view of a mister of the example misting fan system of FIG. 1, in accordance with various embodiments of the present invention.
Figure 5:
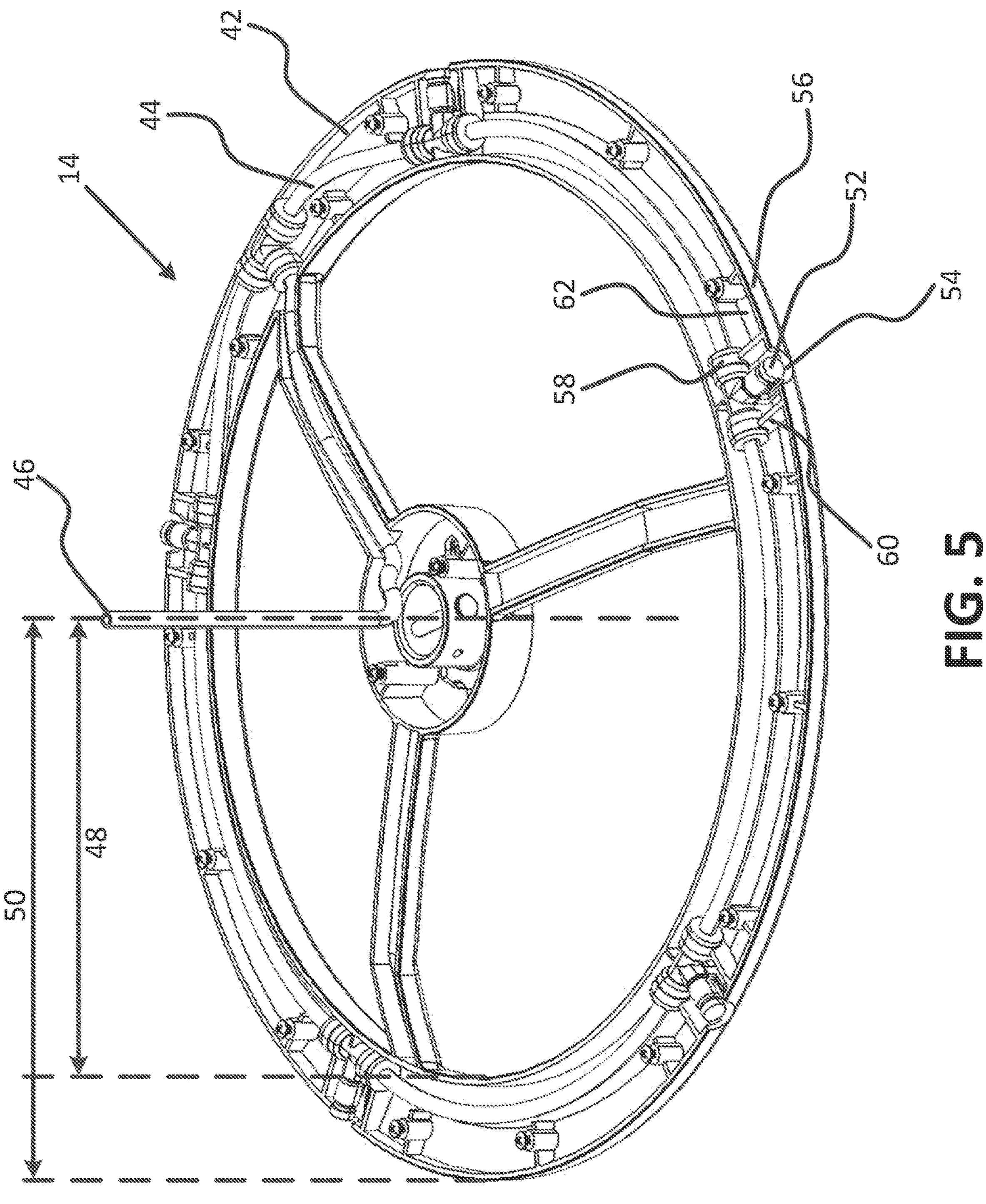
FIG. 5 is a perspective view of the interior of the mister of FIG. 4, in accordance with various embodiments of the present invention.

Referring now to FIGS. 4 and 5, the mister 14 comprises a housing 42 and a manifold assembly 44 disposed within the housing 42. The housing 42 may be made of plastic, such as a heat-resistant and humidity-resistant thermoplastic, for example. Any other appropriate materials and construction may be used for the mister housing 42. The manifold assembly 44 comprises an inlet 46 for a pressurized liquid. The inlet 46 may be in fluid communication with a fluid source, such as a pump.

The mister housing 42 may be substantially circular and may include an inner radius 48 and an outer radius 50. In an embodiment, the outer radius 50 is greater than the first distance D between the inner end 34 of the of the paddle member 24 and the axis A. As a result, at least a portion of the mister housing 42 is disposed directly over at least a portion of one or more of the paddle members 24. It will be appreciated, however, that the housing 42 need not be substantially circular, but rather may be any suitable shape.

Figure 6:
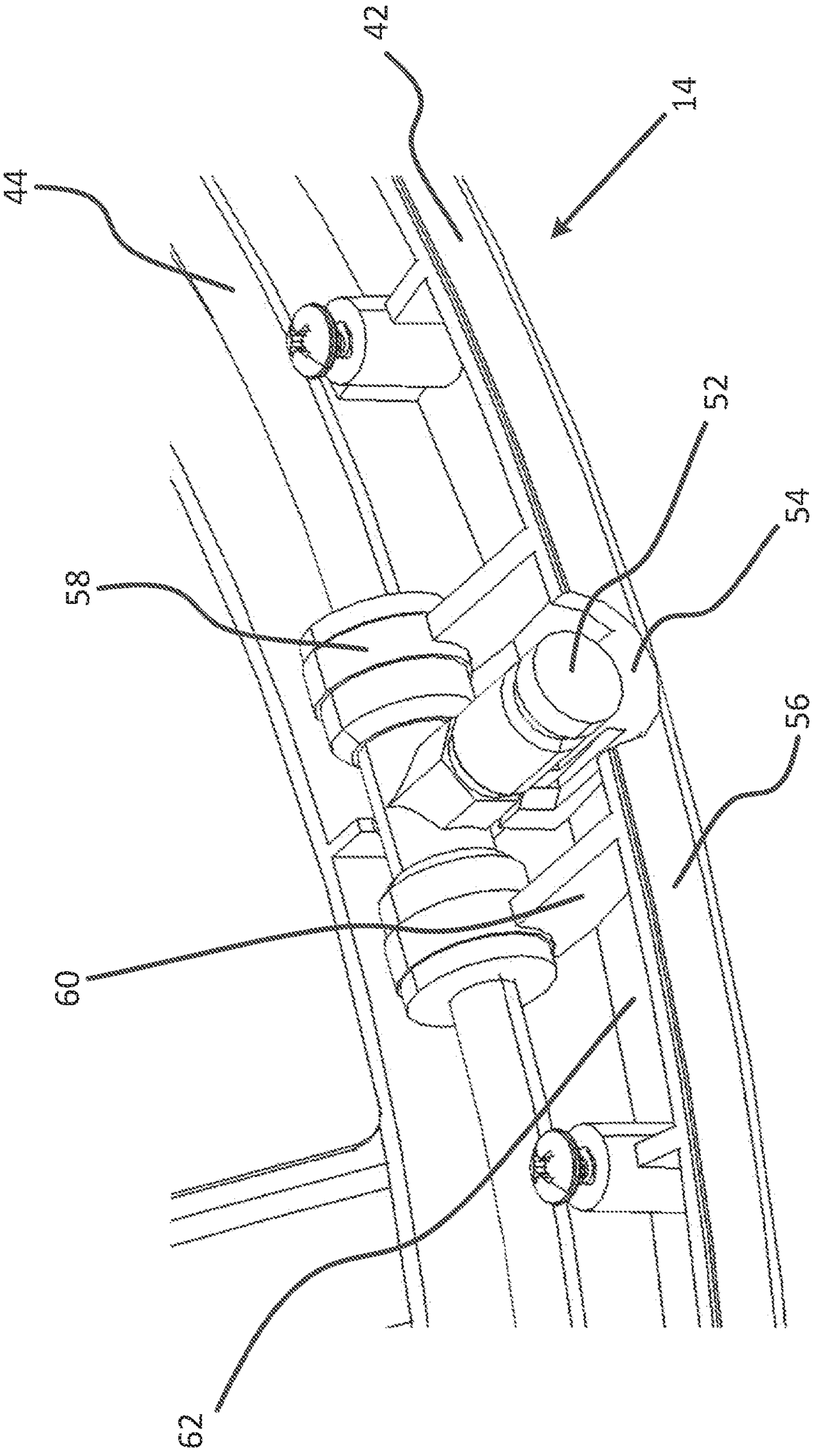
FIG. 6 is an enlarged perspective view of the interior of the mister of FIG. 4, in accordance with various embodiments of the present invention.

As shown in FIGS. 4-6, the mister 14 may further comprise a plurality of nozzles 52 disposed within the housing 42 and radially spaced from each other around an outer periphery of the housing 42. Each of the plurality of nozzles 52 is in fluid communication with the manifold assembly 44 and includes an orifice (not shown) for spraying the pressurized liquid (not shown) outwardly from the manifold assembly 44. The housing 42 may also further include a plurality of holes 54 formed in an outer wall 56 thereof for allowing the pressurized liquid to spray outwardly from the housing 42. In an embodiment, each of the plurality of nozzles 52 is at least partially disposed within the outer wall 56 of the housing 42. In an embodiment, each of the plurality of nozzles 52 is disposed completely within the outer wall 56 of the housing 42. Accordingly, in embodiments, the nozzles 52 may be disposed along the outer radius 50 of the housing, and thus may be disposed directly over at least a portion of one or more of the paddle members 24.

As shown in FIGS. 5 and 6, the example manifold assembly 44 may further comprise a plurality of fittings 58. The housing 42 may comprise a plurality of snap-fit connections 60 spaced along an interior surface 62 thereof for securing the plurality of fittings 58. Each of the plurality of fittings 58 may be coupled to one of the plurality of nozzles 52.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A misting fan system comprising:

a fan including a motor and a fan motor housing, the motor disposed within the fan motor housing, and a plurality of fan blades operably coupled to the motor;

a support shaft connected to the fan for supporting the fan above a ground surface; and a mister positioned above the fan, wherein the mister comprises:

a manifold assembly disposed within a mister housing, the manifold assembly comprising an inlet for a pressurized liquid, wherein the inlet is configured for fluid communication with a fluid source; and a plurality of nozzles disposed within the mister housing, wherein each of the plurality of nozzles is in fluid communication with the manifold assembly and includes an orifice for spraying the pressurized liquid outwardly from the mister housing;

wherein the mister housing defines an aperture through which the support shaft extends and wherein the mister housing is coupled to the fan motor housing.

2. The misting fan system of claim 1, wherein each of the plurality of fan blades comprises a base member and a paddle member mated to the base member, and wherein each paddle member comprises an upper surface and a lower surface.

3. The misting fan system of claim 2, further comprising a hydrophobic coating applied to at least one of the upper surface or the lower surface of the paddle member of at least one of the plurality of fan blades.

4. The misting fan system of claim 3, wherein the hydrophobic coating is UV resistant.

5. The misting fan system of claim 2, wherein each paddle member is made of plastic.

6. The misting fan system of claim 2, wherein:

each paddle member comprises a leading edge and a trailing edge relative to a direction of movement of the paddle member when the fan is in operation, wherein the leading edge is thinner than the trailing edge.

7. The misting fan system of claim 6, wherein the leading edge is higher than the trailing edge.

8. The misting fan system of claim 2, wherein the mister housing is substantially circular.

9. The misting fan system of claim 8, wherein:

each paddle member comprises an inner end proximate the motor and an outer end distal to the motor, wherein the inner end is spaced a first distance away from a central axis;

wherein the mister housing has an inner radius and an outer radius, and wherein the inner radius is greater than the first distance.

10. The misting fan system of claim 8, wherein the plurality of nozzles disposed within the mister housing are radially spaced apart from each other.

11. The misting fan system of claim 1, wherein the manifold assembly further comprises a plurality of fittings, wherein the mister housing comprises a plurality of snap-fit connections spaced along an interior surface thereof for securing the plurality of fittings, and wherein each of the plurality of fittings is coupled to a nozzle having an orifice formed therein for spraying the pressurized liquid outwardly from the manifold assembly.

12. The misting fan system of claim 1, wherein the mister housing is made of a heat-resistant and humidity resistant thermoplastic.

13. The misting fan system of claim 1, wherein the inlet is in fluid communication with a pump.

14. The misting fan system of claim 1, wherein the mister housing is substantially circular.

15. The misting fan system of claim 14, wherein the plurality of nozzles disposed within the mister housing are radially spaced apart from each other.

16. The misting fan system of claim 1, wherein the mister housing includes an inner radius, the fan motor housing includes an outer radius, and the inner radius of the mister housing is greater than or equal to the outer radius of the fan motor housing.

17. The misting fan system of claim 16, wherein the mister housing further includes an outer radius greater than the inner radius, the outer radius and inner radius of the mister housing defines an outer periphery of the mister housing, and the outer periphery defines a plurality of openings distributed around the manifold assembly.

18. The misting fan system of claim 17, wherein the plurality of nozzles are disposed within the outer periphery of the mister housing.

* * * * *